Nov. 29, 1938.      J. L. CHONG      2,138,472
ROOT CHOPPING AND DIRT DISTRIBUTING IMPLEMENT
Filed May 8, 1936
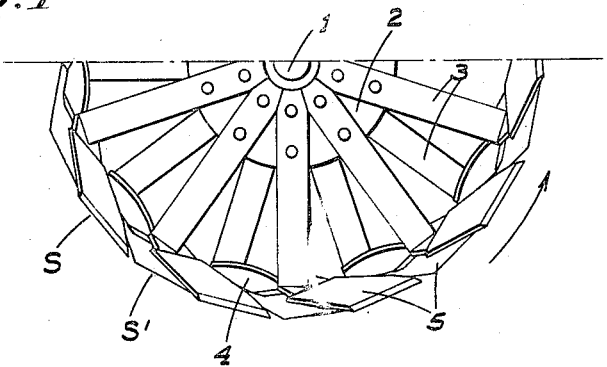
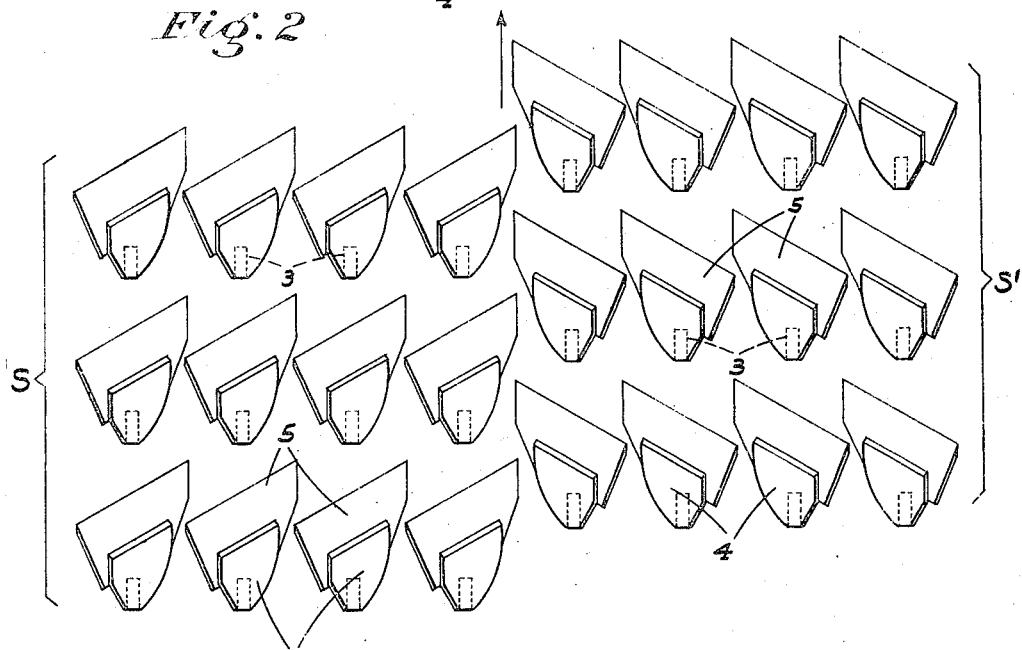
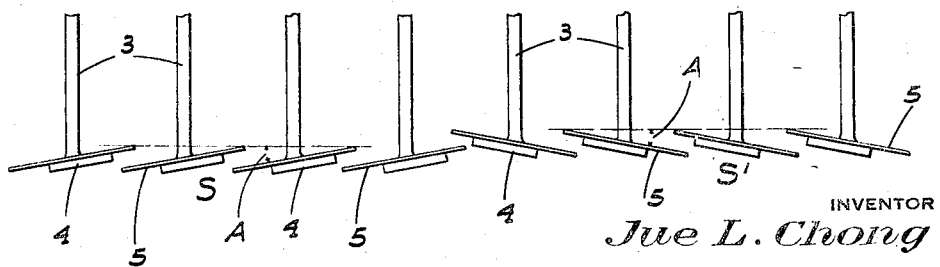
INVENTOR
Jue L. Chong
BY
ATTORNEY Patented Nov. 29, 1938

2,138,472

UNITED STATES PATENT OFFICE 2,138,472

ROOT CHOPPING AND DIRT DISTRIBUTING IMPLEMENT

Jue L. Chong, Isleton, Calif., assignor to Miller and Chong, a copartnership comprising Look L. Chong, Jue L. Chong, Sam L. Chong, and Tony S. Miller Application May 8, 1936, Serial No. 78,589

2 Claims. (Cl. 97—215)

This invention relates to high-speed rotary ground working implements, and particularly to one designed to chop up asparagus roots, such as is shown in Patent No. 1,903,124 dated March 28, 1933.

These plants are long-lived, but after a certain number of years, pass their peak of profitable production and are then destroyed to make way for other crops by chopping up the plants and their roots underground—this being the method found most practicable.

The rows of asparagus are always maintained in the form of relatively wide hills, and with the arrangement of the cutting blades of the implement shown in said patent, as well as in other implements of a like nature, the hilly effect remained even after the ground had been plowed and pulverized by the implement and the plants had been chopped up. This required a subsequent leveling operation to raze the hills and put the ground in condition for planting to another crop, and of course added materially to the cost of operation.

It is therefore the principal object of the present invention to so arrange the cutting blades on the implement that when operating along and in the asparagus hills, they will act to distribute the dirt in the hills so that they are materially leveled off by and with the movement of the implement through and along the hills.

The ground as a whole is thus brought substantially to a level condition, and any further leveling of the same, even if necessary, is a very simple matter, easily performed at a minimum of expense.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a fragmentary side elevation of the improved rotary implement.

Figure 2 is a fragmentary diagrammatic plan lay-out showing the specific arrangement of the sets of blades relative to each other.

Figure 3 is a diagrammatic front elevation of a pair of adjacent bottom rows of blades showing their angular relation to each other.

Referring now more particularly to the characters of reference on the drawing, the rotary implement comprises a central shaft 1, mounted and driven as shown in said patent. Enlarged flanges 2 at intervals along the shaft support radially projecting standards 3, on the outer ends of which are pads 4 projecting forwardly relative to the direction of rotation of the implement. The cutting blades 5 are mounted on the outer faces of the pads, preferably in the manner set forth in Patent No. 1,896,391 dated February 7, 1933.

In carrying out the present invention, the blades are arranged about the shaft in the form of two sets S and S' disposed on opposite sides of the center of length of the shaft 1 arranged in rows preferably extending parallel to the shaft; there being the same number of blades in the rows of the two sets and the blades of each row being arranged to overlap in their cut somewhat.

The pads, and consequently the blades secured thereon, are also arranged with a slope in a transverse plane, so as to include an acute angle A with a horizontal line as indicated in Figure 3.

The angle A of all the blades of the set S face in the same direction, and so that said blades when at the bottom of the implement tilt downwardly toward their outer ends, or in other words are disposed in diverging relation to the shaft in the direction of the corresponding outer end thereof. Likewise, all the blades of the other set S' tilt in the opposite direction or in diverging relationship to the corresponding portion of the shaft. The pads 4 and the flat cutting blades 5 affixed thereon also slope or tilt radially outward toward the cutting or leading edges of the blades. Thus, the blades of each set are canted in a transverse plane towards their outer ends and are canted radially outward in a longitudinal plane towards their cutting edges.

By reason of this angled blade arrangement, it will be seen that as the implement travels along and the blades dig into a hill at high speed while the line of travel of the implement is maintained so that the central plane of the shaft is substantially alined with the peak of the hill, the dirt of the hill through which the blades pass will tend to be thrown or distributed both rearwardly and radially out a substantial distance on opposite sides of and away from the central plane of peak of the hill, thus materially leveling off the hill at the same time as the roots therein are chopped up.

The standards 3 of the blade set S' are circumferentially offset or staggered from those of set S for two reasons. In the first place, this offsetting distributes the blades as a whole about the shaft so that the strains on the driving mechanism will be substantially equalized. In the second place, this offsetting allows the blades of the two sets at the adjacent ends thereof to be disposed so that their paths of cutting overlap, as is desirable in order to avoid any of the ground in which the implement is working being missed by the blades.

If desired to throw the dirt all to one side only, the blades can be set so that all the blades angle in the same direction. From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a high-speed rotary root chopping and dirt distributing implement, a horizontally disposed shaft mounted transverse of the implement and adapted to be driven at high speed, blade standards mounted radially about the shaft, and flat blades mounted on the outer ends of the standards in a plane transversely of said standards and projecting therefrom in the direction of movement thereof; said blades being all canted in a plane transversely of the implement, and canted radially outward toward their leading edges in a plane longitudinally of the implement whereby the dirt pulverized by the implement will be thrown rearwardly, and laterally out a substantial distance.

2. In a high-speed rotary root chopping and dirt distributing implement, a horizontally disposed shaft mounted transverse of the implement and adapted to be driven at high speed, blade standards mounted radially about the shaft, and flat blades mounted on the outer ends of the standards in a plane transversely of said standards and projecting therefrom in the direction of movement thereof; those blades on each side of the longitudinal median line of the implement being canted toward their outer ends in a plane transversely of the implement, and all the blades being canted radially outward toward their leading edges in a plane longitudinally of the implement whereby dirt pulverized by the implement will be thrown rearwardly of the implement, and laterally out a substantial distance relative to the central plane of the shaft.

JUE L. CHONG.